US010826358B2

(12) United States Patent
Kobayashi

(10) Patent No.: US 10,826,358 B2
(45) Date of Patent: Nov. 3, 2020

(54) RECTIFIER STRUCTURE OF VEHICLE-USE ROTATING ELECTRICAL MACHINE

(71) Applicant: Mitsubishi Electric Corporation, Tokyo (JP)

(72) Inventor: Yuzuru Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 471 days.

(21) Appl. No.: 15/569,441

(22) PCT Filed: Aug. 6, 2015

(86) PCT No.: PCT/JP2015/072318
§ 371 (c)(1),
(2) Date: Oct. 26, 2017

(87) PCT Pub. No.: WO2017/022116
PCT Pub. Date: Feb. 9, 2017

(65) Prior Publication Data
US 2018/0083512 A1    Mar. 22, 2018

(51) Int. Cl.
*H02K 11/05*    (2016.01)
*H02K 1/24*    (2006.01)
(Continued)

(52) U.S. Cl.
CPC ............. *H02K 11/05* (2016.01); *H02K 1/243* (2013.01); *H02K 11/046* (2013.01); *H02K 3/50* (2013.01); *H02K 5/22* (2013.01); *H02K 9/06* (2013.01)

(58) Field of Classification Search
CPC ...... H02K 11/05; H02K 1/243; H02K 11/046; H02K 3/50; H02K 5/22; H02K 5/10;
(Continued)

(56) References Cited

U.S. PATENT DOCUMENTS 5,866,963 A    2/1999 Weiner et al.
10,033,243 B2 *    7/2018 Tanaka ..................... H02K 5/18
10,263,531 B2 *    4/2019 Yokoyama .............. H01L 23/36
(Continued)

FOREIGN PATENT DOCUMENTS

DE    102007034325 A1    1/2009
JP    2003-224953 A    8/2003
(Continued)

OTHER PUBLICATIONS

Communication dated Dec. 21, 2018, from European Patent Office in counterpart application No. 15900427.4.

*Primary Examiner* — Tulsidas C Patel
*Assistant Examiner* — Ahmed Elnakib
(74) *Attorney, Agent, or Firm* — Sughrue Mion, PLLC; Richard C. Turner

(57) ABSTRACT

A first tubular portion and a second tubular portion extended from a main body portion of a terminal block configuring a rectifying device are inserted into a casing through hole of a rear bracket configuring a casing of a vehicle-use alternating current generator, and the rectifying device is attached to a main body portion side. The first tubular portion including a sealing portion that seals the casing through hole is inserted into the casing through hole into which a lead is not inserted, and the second tubular portion of a form enclosing the lead is inserted into the casing through hole into which the lead is inserted.

8 Claims, 9 Drawing Sheets

(51) Int. Cl.
*H02K 11/04* (2016.01)
*H02K 5/22* (2006.01)
*H02K 3/50* (2006.01)
*H02K 9/06* (2006.01)

(58) Field of Classification Search
CPC .......... H02K 9/06; H02K 5/225; B60R 16/03; B60Y 2400/60
USPC .................................................. 310/71, 68 D
See application file for complete search history.

(56) References Cited

U.S. PATENT DOCUMENTS

| | | | | |
|---|---|---|---|---|
| 10,516,321 | B2* | 12/2019 | Kobayashi | ............... H02K 9/28 |
| 2003/0147212 | A1 | 8/2003 | Ogi | |
| 2007/0046114 | A1* | 3/2007 | Kondo | ................. H01L 25/115 |
| | | | | 310/68 D |
| 2007/0103012 | A1 | 5/2007 | An et al. | |
| 2009/0058211 | A1* | 3/2009 | Oowatari | ................. H02K 3/02 |
| | | | | 310/179 |
| 2009/0134749 | A1* | 5/2009 | Nakamura | ........... H02K 11/046 |
| | | | | 310/68 D |
| 2012/0126638 | A1* | 5/2012 | Tanaka | ................. H02K 11/046 |
| | | | | 310/43 |
| 2014/0225461 | A1* | 8/2014 | Ohashi | ..................... H02K 5/04 |
| | | | | 310/43 |
| 2015/0162846 | A1* | 6/2015 | Yokoyama | ............... H01L 23/36 |
| | | | | 363/141 |
| 2017/0222522 | A1* | 8/2017 | Kobayashi | ............. H02K 5/225 |
| 2018/0083512 | A1* | 3/2018 | Kobayashi | ............. H02K 1/243 |

FOREIGN PATENT DOCUMENTS

| | | |
|---|---|---|
| JP | 2006-115695 A | 4/2006 |
| WO | 2013/069153 A1 | 5/2013 |

\* cited by examiner

RECTIFIER STRUCTURE OF VEHICLE-USE ROTATING ELECTRICAL MACHINE

CROSS REFERENCE TO RELATED APPLICATIONS

This application is a National Stage of International Application No. PCT/JP2015/072318 filed Aug. 6, 2015, the contents of all of which are incorporated herein by reference in their entirety.

TECHNICAL FIELD

The present invention relates to a vehicle-use rotating electrical machine such as a vehicle-use alternating current generator, and in particular, relates to a structure of a rectifying device configuring a vehicle-use rotating electrical machine.

BACKGROUND ART

An existing vehicle-use alternating current generator is such that a rectifying device is attached to an outer side end face of a rear bracket configuring a casing, and a circuit board (terminal block) is configured on the rectifying (device. Further, a lead drawn out from a stator winding configuring a stator passes through a through hole of the rear bracket, and is connected to a terminal of the circuit board, whereby the rectifying device and stator winding are electrically connected. Because of this, a tubular portion for guiding the lead drawn out from the stator winding to an appropriate position when assembling is provided on the circuit board, and the tubular portion is inserted into the through hole of the rear bracket (for example, refer to Patent Document 1).

CITATION LIST

Patent Literature

Patent Document 1: WO 2013/069153 A1

SUMMARY OF INVENTION

Technical Problem

However, when extension places of the lead drawn out from the stator winding are reduced in accordance with a stator specification change or the like, the terminal block tubular portion (guide portion) positioned in a place in which an eliminated lead has originally been inserted in the terminal block through which the lead is inserted becomes unnecessary due to losing the function thereof, and is removed from the terminal block. Because of this, it is supposed that the rear bracket through hole (casing through hole) in the place from which the unneeded tubular portion has been removed is closed by building up the rear bracket, and used.

A reason for closing the rear bracket through hole remaining in the portion from which the tubular portion has been removed from the terminal block when the lead extension places are reduced in accordance with a specification change is to prevent a leakage or backflow of cooling air from the through hole, thus obtaining a cooling performance in accordance with design. Hypothetically, when the rear bracket through hole remains without being closed, a problem occurs in that cooling air drawn in by a rotor fan leaks from the remaining through hole, and ventilation is not carried out along a path in accordance with design. Also, design is such that cooling air drawn in by the rotor fan and flowing as far as a vicinity of the fan is curved in a centrifugal direction by the fan, cools a coil end of the stator winding, and is discharged to the exterior, but when there is a through hole remaining in the rear bracket, a problem occurs in that cooling air flowing as far as the vicinity of the fan flows back through the through hole, ventilation is not carried out along a path in accordance with design, and coolability worsens.

For the heretofore described reason, a rear bracket needs to be newly fabricated for a product with specifications such that extension places of the lead drawn out from the stator winding are reduced, as a result of which there is an increase in the cost of the product, and there is a problem in that the rear bracket cannot be commonly used, that is, the rear bracket cannot be standardized, with respect to specifications such that extension places of the lead are changed.

Furthermore, when the rear bracket through hole is used in a form closed in a portion from which the lead has been eliminated, a large model change in the rear bracket itself is needed, and furthermore, product weight increases by an amount corresponding to material used for closing the through hole, and material costs are also incurred, because of which there are also problems in terms of weight reduction and manufacturing cost reduction.

The invention, having been contrived in order to resolve the heretofore described problems, has an object of providing a vehicle-use rotating electrical machine such that even when extension places of a drawn-out lead are reduced, a casing through hole can be closed without removing a tubular portion extended from a terminal block, cooling air is prevented from leaking or flowing back from the through hole, cooling performance in accordance with design is secured, and a rear bracket (one portion of the casing) can be commonly used

Solution to Problem

A vehicle-use rotating electrical machine according to the invention includes a stator disposed inside a casing, a rotor rotatably supported inside the stator, a rectifying device disposed on an outer side of the casing on one side in an axial direction and rectifying alternating current generated in the stator, and a terminal block provided in the rectifying device and electrically connected to a stator winding of the stator, and is characterized in that the terminal block has first and second tubular portions extended from a main body portion of the terminal block and inserted individually into a multiple of casing through holes formed in the casing, the first tubular portion is inserted into the casing through hole into which a lead of the stator winding is not inserted and a sealing portion that seals the casing through hole is formed, and the second tubular portion is inserted into the casing through hole into which the lead of the stator winding is inserted, covers a periphery of the lead of the stator winding, and a guide portion that guides an insertion of the lead is formed.

Advantageous Effects of Invention

According to the vehicle-use rotating electrical machine of the invention, a configuration is such that a region of a casing through hole into which no lead is drawn out is sealed with a first tubular portion including a sealing portion extended from a main body portion of a terminal block, because of which cooling air can be prevented from leaking or flowing back from the casing through hole, and cooling performance can be secured. Also, even when a number of leads drawn out differs in accordance with a model, this can be responded to by either the first tubular portion including the sealing portion or a second tubular portion including a lead through hole into which a lead is inserted while being guided being disposed in the casing through hole, a model change in just one portion of the terminal block is sufficient, and a casino (rear bracket) can be commonly used.

Other objects, characteristics, aspects, and advantages of the invention will become further apparent from the following detailed description of the invention, with reference to the drawings.

DESCRIPTION OF EMBODIMENTS

First Embodiment

Hereafter, using FIG. 1 to FIG. 8, a vehicle-use alternating current generator 1 according to a first embodiment of the invention will be described. The drawings will be described with the same reference signs allotted to identical or corresponding portions. In the first embodiment of the invention, the vehicle-use alternating current generator 1 is shown as an example of a vehicle-use rotating electrical machine.

Firstly, a basic structure of the vehicle-use alternating current generator 1 of the invention will be described.

Figure 1:
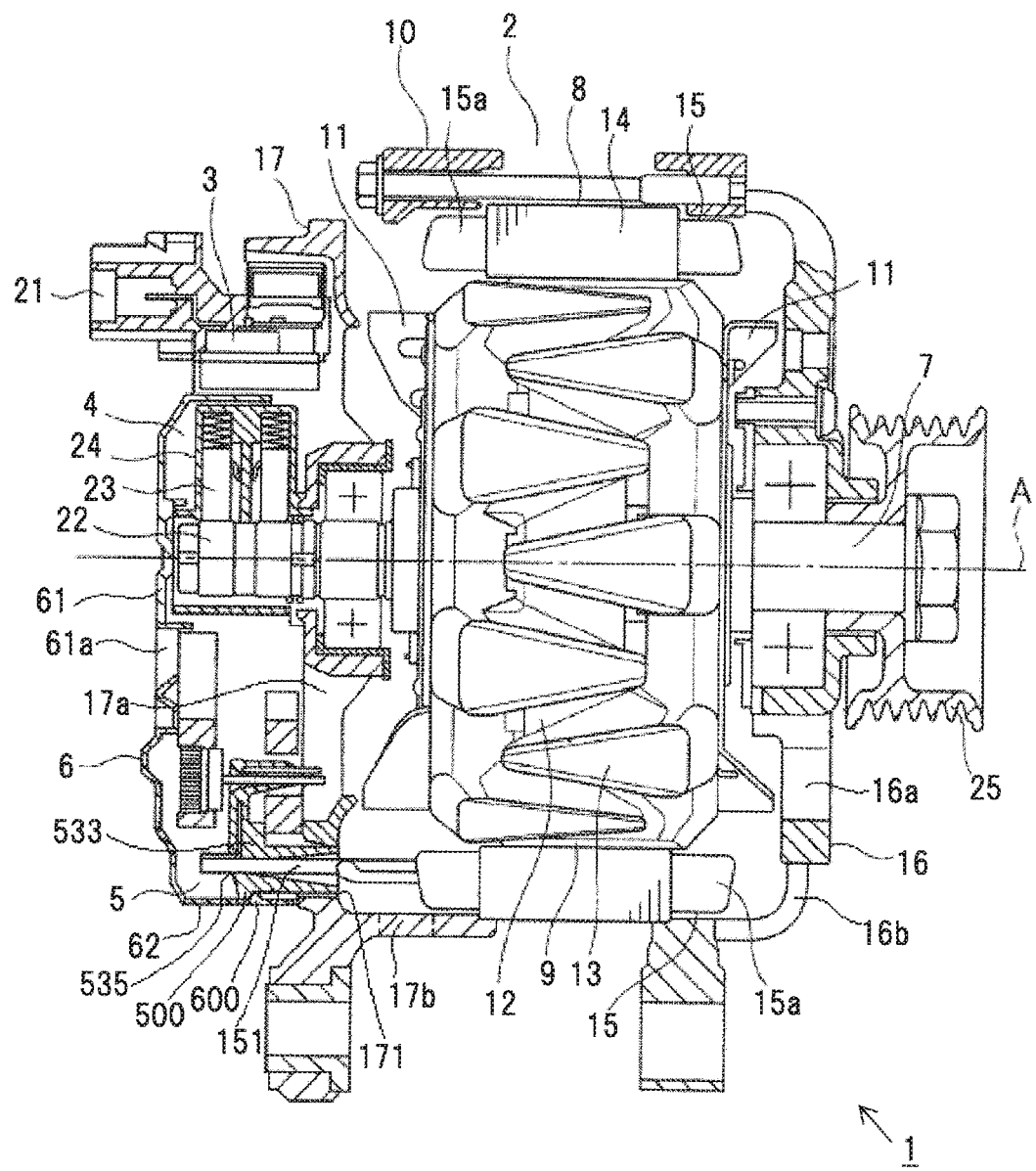
FIG. 1 is a longitudinal sectional view showing a vehicle-use alternating current generator according to a first embodiment of the invention.

FIG. 1 is a longitudinal sectional view showing the vehicle-use alternating current generator according to the first embodiment of the invention. In the drawing, the vehicle-use alternating current generator 1 has a generator main body 2, which is a rotating electrical machine main body, a voltage regulator 3, a brush device 4, and a rectifying device 5, each of which is attached to the generator main body 2, and a protective cover 6 that covers the voltage regulator 3, the brush device 4, and the rectifying device 5. The vehicle-use alternating current generator 1 is a rotating electrical machine mounted in, for example, a vehicle such as an automobile.

The generator main body 2 has a shaft 7 having an axial line A, a tubular stator 8 disposed coaxially with the shaft 7, a rotor 9 fixed to the shaft 7 and disposed on an inner side of the stator 8, a casing 10 that supports the stator 8 and the rotor 9, and fans 11 provided in either axial direction end portion of the rotor 9 (that is, either end portion in a direction following the axial line A of the rotor 9).

The rotor 9 and each fan 11 rotate integrally with the shaft 7 with respect to the stator 8, centered on the axial line A. Each fan 11 generates cooling air by rotating integrally with the rotor 9. Also, the rotor 9 has a field winding 12 that generates magnetic flux owing to a supply of an exciting current, and a pole core 13 on which the field winding 12 is provided, and in which a magnetic pole is formed by the magnetic flux of the field winding 12.

The stator 8 is fixed to the casing 10. Also, the stator 8 has a cylindrical stator iron core 14 that encloses an outer periphery of the rotor 9, and a multiple of stator windings 15 provided in the stator iron core 14. Both axial direction end portions of each stator winding 15 protrude as coil ends 15a from both axial direction end faces of the stator iron core 14. Alternating current electromotive force is generated in each stator winding 15 by the magnetic flux of the field winding 12 changing in accompaniment to the rotation of the rotor 9.

The casing 10 has a front bracket 16 and a rear bracket 17 made of aluminum. A form of each of the front bracket 16 and the rear bracket 17 is an approximate bowl form. An intake port 16a and an intake port 17a are formed in an axial direction end face of the front bracket 16 and the rear bracket 17. Also, a discharge port 16b and a discharge port 17b are formed in an outer peripheral edge portion of the front bracket 16 and the rear bracket 17 so as to be positioned outward of the coil end 15a in a radial direction. The front bracket 16 and the rear bracket 17 are fixed to each other with a multiple of bolts in a state sandwiching the stator iron core 14, with aperture portions facing each other in the axial direction (that is, the direction following the axial line A).

The voltage regulator 3 regulates the magnitude of alternating current voltage generated in each stator winding 15. A connector 21 electrically connected to an unshown external device is attached to the rear bracket 17. The voltage regulator 3 communicates with the external device via the connector 21.

The brush device 4 has a pair of slip rings 22 fixed to a portion of the shaft 7 protruding from the rear bracket 17, a pair of brushes 23 that come into contact with one each of the slip rings 22, and a brush holder 24 that houses the brushes 23. The slip rings 22 slide along the brushes 23 owing to the rotation of the shaft 7. Field current is supplied from an unshown battery through the brush device 4 to the field winding 12 of the rotor 9.

The rectifying device 5 is disposed on an outer side of the casing 10 on one side in the shaft 7 direction, and rectifies alternating current generated in each stator winding 15 into direct current. The rectifying device 5 is disposed so as to enclose a periphery of the shaft 7 together with the voltage regulator 3 and the brush device 4.

A pulley 25 is fixed to a portion of the shaft 7 protruding from the front bracket 16. An unshown transmission belt coupled to an engine output shaft is wrapped around the pulley 25. Engine rotational torque is transmitted from the engine output shaft to the shaft 7 via the transmission belt. The shaft 7, rotor 9, and each fan 11 rotate centered on the axial line A owing to the shaft 7 receiving the rotational torque from the engine.

Figure 2:
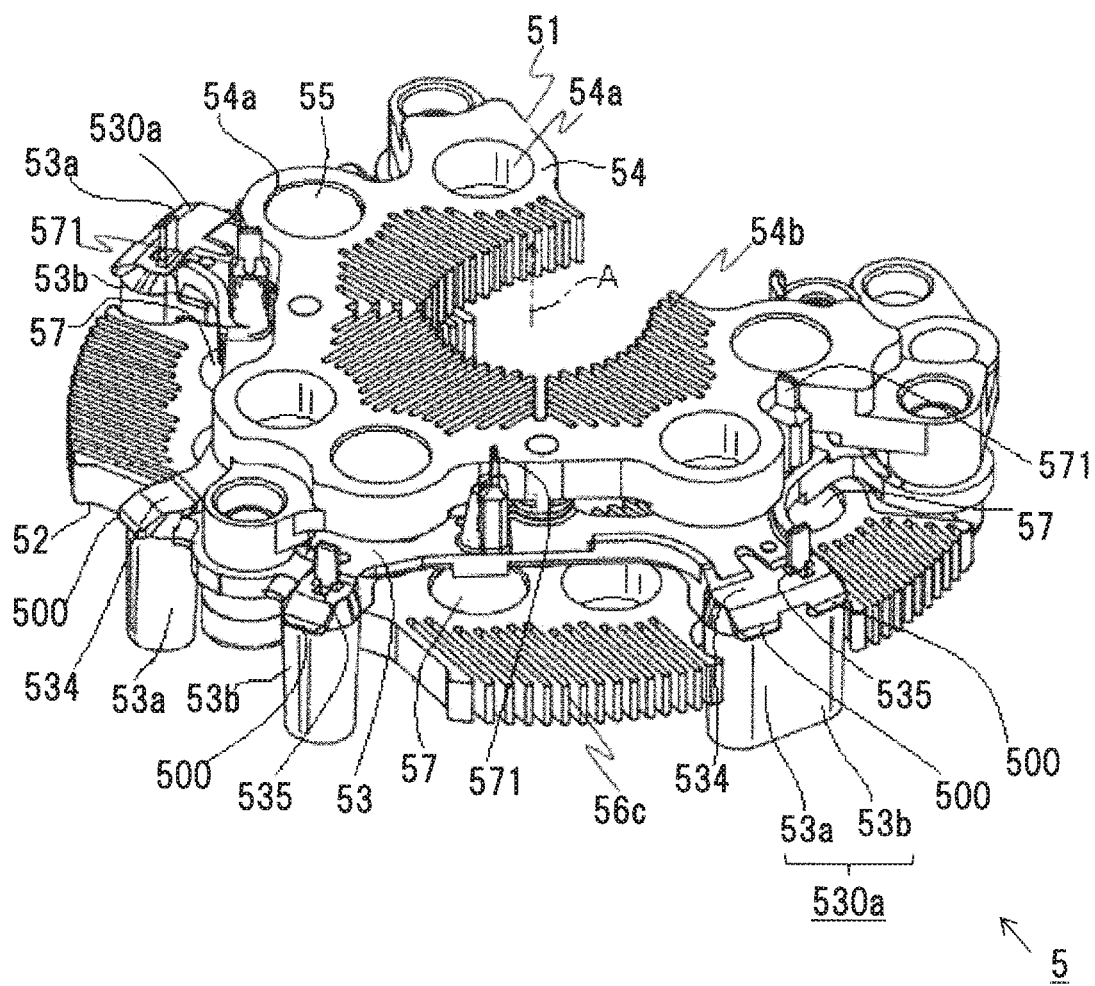
FIG. 2 is a perspective view showing a rectifying device of the vehicle-use alternating current generator of FIG. 1.
Figure 3:
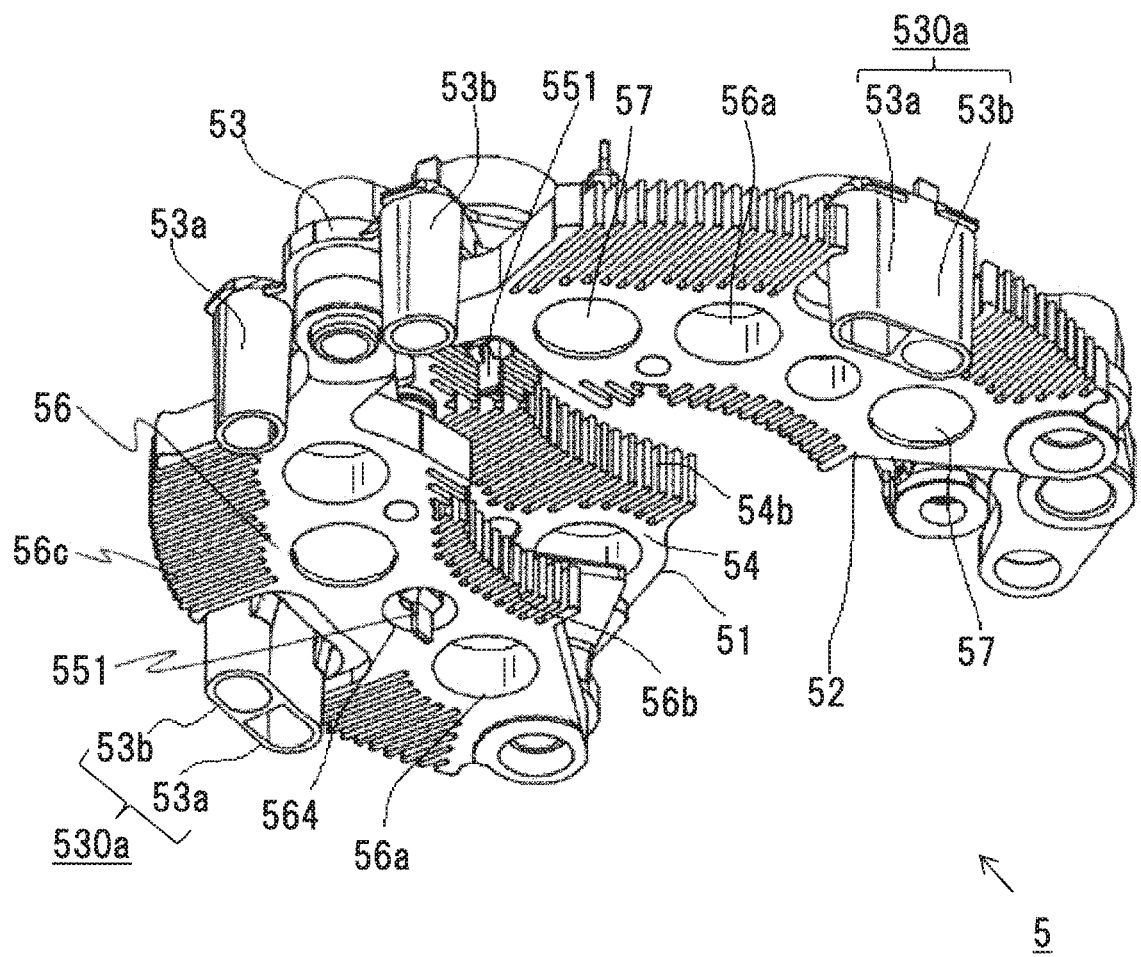
FIG. 3 is a perspective view of the rectifying device of FIG. 2 seen from a generator main body side.

Next, using FIG. 2 and FIG. 3, the rectifying device 5 shown in FIG. 1 will be described in more detail. FIG. 2 is a perspective view of the rectifying device 5 of the vehicle-use alternating current generator 1 of FIG. 1 when seen from the protective cover 6 side. Also, FIG. 3 is a perspective view of the rectifying device 5 of FIG. 2 when seen from the generator main body 2 side. The rectifying device 5 has a positive side rectifying unit 51 (corresponding to a first support body) disposed distanced from the generator main body 2 in an axial line direction, a negative side rectifying unit 52 (corresponding to a second support body) disposed between the positive side rectifying unit 51 and the rear bracket 17 in the axial line direction, and a terminal block 53, disposed between the positive side rectifying unit 51 and negative side rectifying unit 52 and coupling the positive side rectifying unit 51 and the negative side rectifying unit 52. The positive side rectifying unit 51, the negative side rectifying unit 52, and the terminal block 53 are disposed individually on mutually differing planes perpendicular to the axial line A.

The positive side rectifying unit 51, as shown in FIG. 2, has a positive side heatsink 54 (corresponding to a first heatsink), a multiple (three in this example) of positive side rectifying elements 55 (corresponding to first rectifying elements) provided on the positive side heatsink 54, and a multiple (six in this example) of support portions 54a (corresponding to rectifying element support portions) that support the positive side rectifying elements 55. The support portion 54a is a hole provided in a main body portion of the approximately C-shaped positive side heatsink 54, and a multiple of fins 54b are formed protruding in an inner peripheral portion of the positive side heatsink 54. The fins 54b positioned on the inner periphery of each positive side heatsink 54 are disposed along the axial line A further to a radial direction inner side than the main body portion of the positive side heatsink 54.

The negative side rectifying unit 52, as shown in FIG. 3, has a negative side heatsink 56 (corresponding to a second heatsink), a multiple (three in this example) of negative side rectifying elements 57 (corresponding to second rectifying elements) provided on the negative side heatsink 56, and a multiple (six in this example) of support portions 56a. (corresponding to rectifying element support portions) that support the negative side rectifying elements 57. The support portion 56a is a hole provided in a main body portion of the approximately C-shaped negative side heatsink 56, a multiple of fins 56b protrude from an inner peripheral portion of the main body portion of the negative side heatsink 56, and a multiple of fins 56c protrude from an outer peripheral portion of the main body portion of the negative side heatsink 56. The fins 56b formed in a multiple of places in the inner peripheral portion of the negative side heatsink 56 are provided protruding to a radial direction inner side from the main body portion of the negative side heatsink 56, and grooves of the fins 56b are disposed along the axial line A. Also, the fins 56c formed on the outer periphery of the negative side heatsink 56 are provided protruding to a radial direction outer side from the main body portion of the negative side heatsink 56, and grooves of the fins 56c are disposed along the axial line A.

Figure 4:
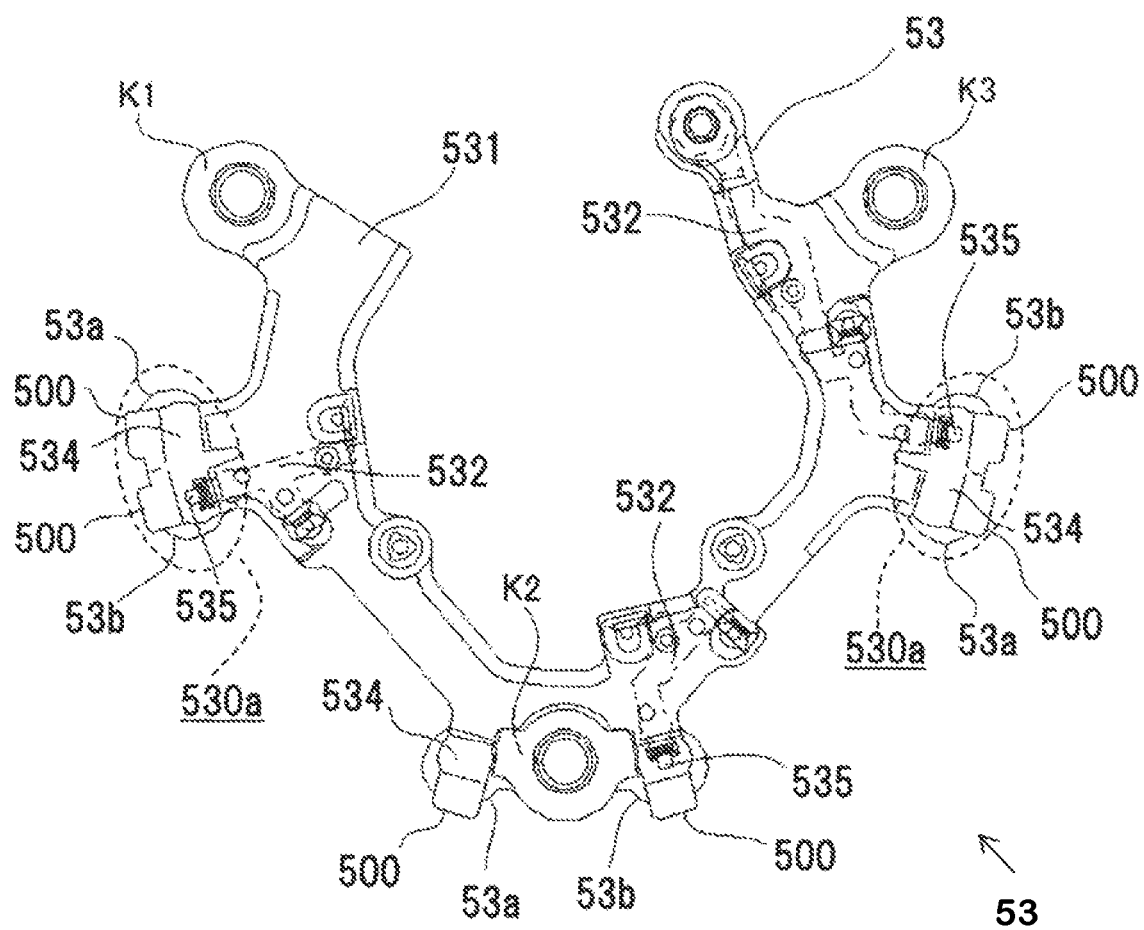
FIG. 4 is a plan view showing a terminal block configuring the rectifying device of the vehicle-use alternating current generator according to the first embodiment of the invention.

Next, a plan view of the terminal block 53 will be shown in FIG. 4 and described. The terminal block 53 has a C-shaped insulating board 531 configured of an electrically insulating material, and a lead 532 embedded in the insulating board 531. A PPS (polyphenylene sulfide) resin, or the like, is used as the electrically insulating material configuring the insulating board 531, and an electrically isolated state is maintained between the lead 532 of the terminal block 53 and a part in a periphery thereof.

Herein, a connection line protruding from each positive side rectifying element 55 toward the negative side rectifying unit 52 is connected to the lead 532 of the terminal block 53 in positive side welded portions 551 shown in FIG. 3. One of the positive side welded portions 551 is disposed in an aperture portion 564 of the negative side heatsink 56.

Also, a connection line protruding from each negative side rectifying element 57 toward the positive side rectifying unit 51 is connected to the lead 532 of the terminal block 53 in negative side welded portions 571 shown in FIG. 2. Because of this, the positive side rectifying elements 55 and the negative side rectifying elements 57 are electrically connected to each other in pair relationships via the lead 532 of the terminal block 53.

As shown in FIG. 1, the protective cover 6 of the rectifying device 5 is molded into a bottomed cylindrical form formed of a bottom portion 61 and a cylindrical peripheral wall portion 62 using an insulating resin such as polybutylene terephthalate (PET) or nylon 66, and a multiple of intake holes 61a that take external air into the generator are disposed in the bottom portion 61.

The vehicle-use alternating current generator configured in this way is such that field current is supplied from the battery (not shown) via the brush 23 and the slip ring 22 to the field winding 12, whereby magnetic flux is generated. Owing to this magnetic flux, N-poles and S-poles are formed alternately in a circumferential direction on an outer periphery of the pole core 13.

Meanwhile, rotational torque of the engine is transmitted to the shaft 7 via the belt (not shown) and the pulley 25, whereby the rotor 9 rotates. Therefore, a rotating magnetic field is applied to the stator winding 15 of the stator 8, and electromotive force is generated in the stator winding 15. Further, the alternating current electromotive force generated in the stator winding 15 is rectified into direct current by the rectifying device 5, and the magnitude of the output voltage thereof is regulated by the voltage regulator 3 and supplied to the battery or a vehicle-mounted electrical load.

Also, the fan 11 rotates in conjunction with the rotation of the rotor 9, external air is taken into the interior of the protective cover 6 from the intake hole 61a, and the external air, after cooling an unshown cooling portion of the voltage regulator 3 and the positive side heatsink 54 and the negative side heatsink 56 of the rectifying device 5, flows into the rear bracket 17. Further, external air that flows as far as a vicinity of the fan 11 is curved in a centrifugal direction by the fan 11, cools the coil end 15a of the stator winding 15, and is discharged to the exterior. The above is an outline of the configuration of the vehicle-use alternating current generator 1.

Next, a description will be given of a configuration of the rectifying device 5, the terminal block 53 of the rectifying device 5, the rear bracket 17 configuring the casing 10, and a casing through hole 171 opened in the rear bracket 17, which are characteristic features of the invention.

As shown in the perspective view of the rectifying device 5 of FIG. 2, a second tubular portion 53b extended from a main body portion of the terminal block 53 is disposed in the terminal block 53 of the rectifying device 5 in order to guide a lead 151 drawn out from the stator winding 15 to an appropriate position when assembling. A sealing portion 534 that closes off the tubular portion is provided on a first tubular portion 53a extended from the main body portion of the terminal block 53 in the same way as the second tubular portion 53b.

When assembling the terminal block 53 on the rear bracket. 17, the first tubular portion 53a is disposed in a position corresponding to the casing through hole 171 in a place to which the lead 151 from the winding of the stator winding 15 is not extended. Also, each of a guide portion 533 (refer to FIG. 1) into which the lead 151 drawn out from the stator winding 15 is guided and, on a terminal side (the protective cover 6 side) of the guide portion 533, a lead through hole 535 is provided in the second tubular portion 53b, disposed in a position corresponding to the casing through hole 171 into which the lead 151 drawn out from the winding of the stator winding 15 is inserted.

Figure 5A:
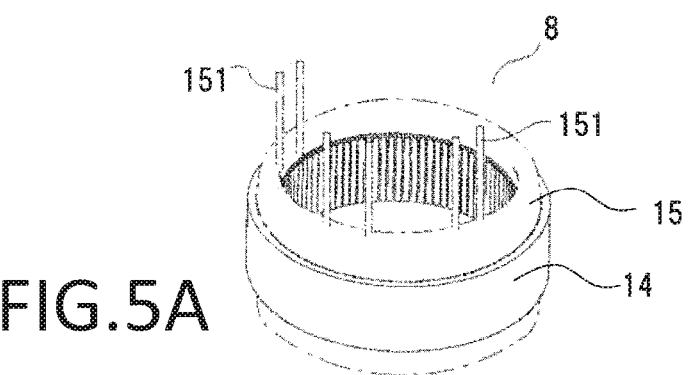
FIGS. 5A, 5B and 5C are schematic perspective views showing a stator of the vehicle-use alternating current generator according to the first embodiment of the invention.

Herein, as shown in schematic perspective views of the stator 8 in FIGS. 5 A, 5B and 5C, an extended state of the lead 151 drawn out from the stator winding 15 differs in accordance with a device model. For example, when the stator winding 15 extends the lead 151 from six places, as shown in FIG. 5A, six tubular portions extended from the terminal block 53 are all the second tubular portion 53b, the second tubular portion 53b is inserted into all of the corresponding casing through holes 171 of the rear bracket 17, and the rear bracket 17 is closed off.

Figure 5B:
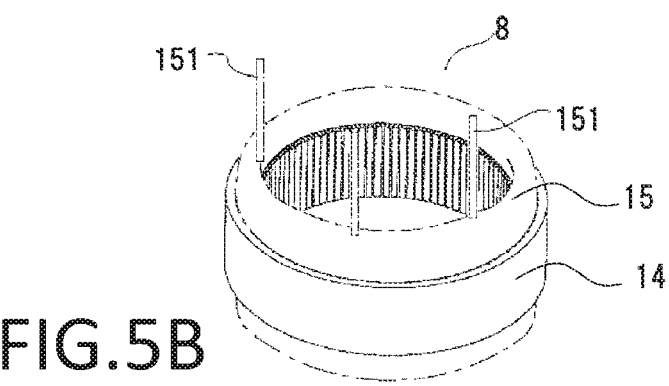

Also, in a case of a structure such that every other lead in a circumferential direction of the leads 151 in six places in FIG. 5A is removed, the leads 151 in three places are an a state of being disposed distanced from each other in the circumferential direction, as shown in FIG. 5B. In this case, the terminal block 53 is such that the second tubular portion 53b is disposed in three places corresponding to the lead 151, and the first tubular portion 53a is provided in places from which the lead 151 has been removed (three places in this case).

That is, the first tubular portion 53a into which no lead is inserted can be obtained by the sealing portion 534 being provided in place of the lead through hole 535 of the second tubular portion 53b into which the lead is inserted, and a sealed state of the casing through hole 171 of the rear bracket 17 can be obtained, practically without changing the form of the tubular portion, the casing through hole, or the like, with respect to differing specifications of the extension places of the lead 151.

Figure 5C:
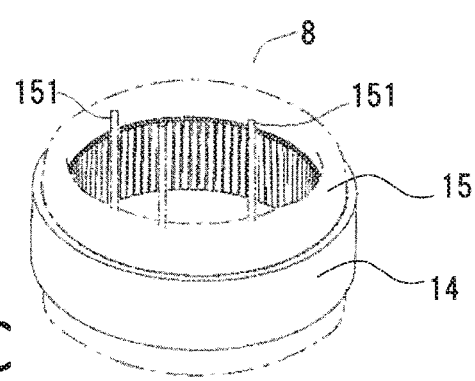

A case in FIG. 5C in which three leads 151 are disposed in proximity in the circumferential direction will be described in detail in a second embodiment to be described hereafter. Depictions of the coil end 15a and wiring are omitted from FIGS. 5A, 5B and 5C. Also, as the sealing portion 534 can be of a structure integral with the first tubular portion 53a, there is no need for a separate part, and no cost is incurred.

Also, by adopting a structure such that some of the second tubular portions 53b previously disposed on the terminal block 53 are replaced with the first tubular portion 53a depending on the model, there is no great change in the external form of the terminal block 53, which has an advantage in that a combined configuration of a projection 500 on an outer peripheral wall face of the terminal block 53 and a projection 600 on an inner peripheral wall face of the protective cover 6 can be specified with one specification. Forms of the projection 500 (refer to FIG. 1 and FIG. 2), provided on outer peripheral wall faces of the first tubular portion 53a and the second tubular portion 53b of the terminal block 53, and the projection 600 (refer to FIG. 1), provided in a corresponding region of the inner peripheral wall face of the protective cover 6, do not change due to an interchange of the tubular portions, and when assembling the device, the protective cover 6 can be caused to mesh with the same accuracy, without affecting an interchange of tubular portions, in a step of bringing the protective cover 6 close to the rear bracket 17 by aligning axes, and the protective cover 6 can be mounted on the rectifying device 5 (that is, on the generator main body 2 side).

Owing to the first tubular portion 53a and the second tubular portion 53b being of the same tubular form in this way, there is no need to change the specifications of the protective cover 6, and a degree of assembly can be of a constant state regardless of specifications, even when there is a change in the number of leads 151 drawn out.

In the examples shown in FIG. 2 and FIG. 4, the first tubular portion 53a and the second tubular portion 53b are disposed partially gathered on the terminal block 53, and the tubular portions are disposed dispersed among the casing through holes 171 in four places formed around the axial line A on the rear bracket 17. Second tubular portions 53b including lead through holes 535 corresponding to the number of rectifying element pairs (that is, the number of leads 532) are disposed in three of the six places in which there are tubular portions, and the first tubular portions 53a including the sealing portions 534 are disposed in the remaining three places.

Also, there are three each of the positive side rectifying element 55 attached to the positive side heatsink 54 and the negative side rectifying element 57 attached to the negative side heatsink 56, corresponding to a phase number of the stator winding 15, but the support portions 54a and 56a (hole portions) that support the positive side rectifying elements 55 and the negative side rectifying elements 57 of the positive side heatsink 54 and the negative side heatsink 56 are provided to a number greater than that of the rectifying elements, and a multiple of rectifying elements on the same heatsink are disposed distanced so as to be unlikely to be mutually affected thermally.

Furthermore, when the protective cover 6 is mounted on the rectifying device 5, the projection 500 provided on the outer peripheral wall faces of the first tubular portion 53a and the second tubular portion 53b of the terminal block 53 of the rectifying device 5, and the projection 600 provided in a corresponding region of the inner peripheral face of the inner wall portion 62 of the protective cover 6, as heretofore described, are in a state of meshing as shown in FIG. 1. Further, a radial direction pendular oscillation of the first tubular portion 53a and the second tubular portion 53b unique to the terminal block 53 is restricted by the latching of the projection 500 and the projection 600. In particular, a large advantage is obtained in a place in which the first tubular portion 53a and the second tubular portion 53b are provided distanced from a portion of the terminal block 53 fixed to the casing 10. When fixed portions are taken to be K1, K2, and K3 in FIG. 4, which is a plan view of the terminal block 53, the first tubular portion 53a and the second tubular portion 53b disposed in each of a circumferential direction intermediate portion between K1 and K2 and a circumferential direction intermediate portion between K3 and K2 are more likely to be affected by oscillation when mounted in a vehicle than the first tubular portion 53a and the second tubular portion 53b disposed on either circumferential direction side of K2. In a worst case, there is concern that being affected by the oscillation results in losing the electrical connection with the lead 151 being guided. According to the heretofore described meshing configuration, this kind of oscillation can be restricted. This structure is also such that the specifications of the first tubular portion 53a and the second tubular portion 53b are practically the same, because of which, is terms of design, there is no need for redesigning or the like, as a result of which cost is restricted.

In FIG. 2 to FIG. 4, one first tubular portion 53a and one second tubular portion 53b are joined, and the integrally formed structural body is shown as a tubular body 530a. Herein, the tubular body 530a is a structure used when one lead 151 is inserted, but when a tubular body formed of a multiple of tubular portions is inserted into the casing through hole 171 to which no lead 151 is drawn out, a tubular body 530b (shown in FIG. 9, to be described hereafter) wherein, for example, two first tubular portions 53a are joined is disposed. The tubular body 530b is described in the second embodiment, to be described hereafter. Also, when two leads 151 are inserted into one casing through hole 171, a tubular body wherein two second tubular portions 53b are joined is disposed.

In the heretofore described example, a case wherein the projection 500 and the projection 600 are coupled is shown, but a structure such that at least a projection provided on one is coupled to the other may be adopted. That is, the advantage of restricting oscillation is obtained by one projection 500 or one projection 600 being provided on the first tubular portion 53a, the second tubular portion 53b, or the peripheral wall portion 62 of the protective cover 6. As opposed to this, it goes without saying that when the projection 500 and the projection 600 are provided as a pair, an advantage of preventing a still more secure protective cover 6 from falling off is obtained.

Figure 6:
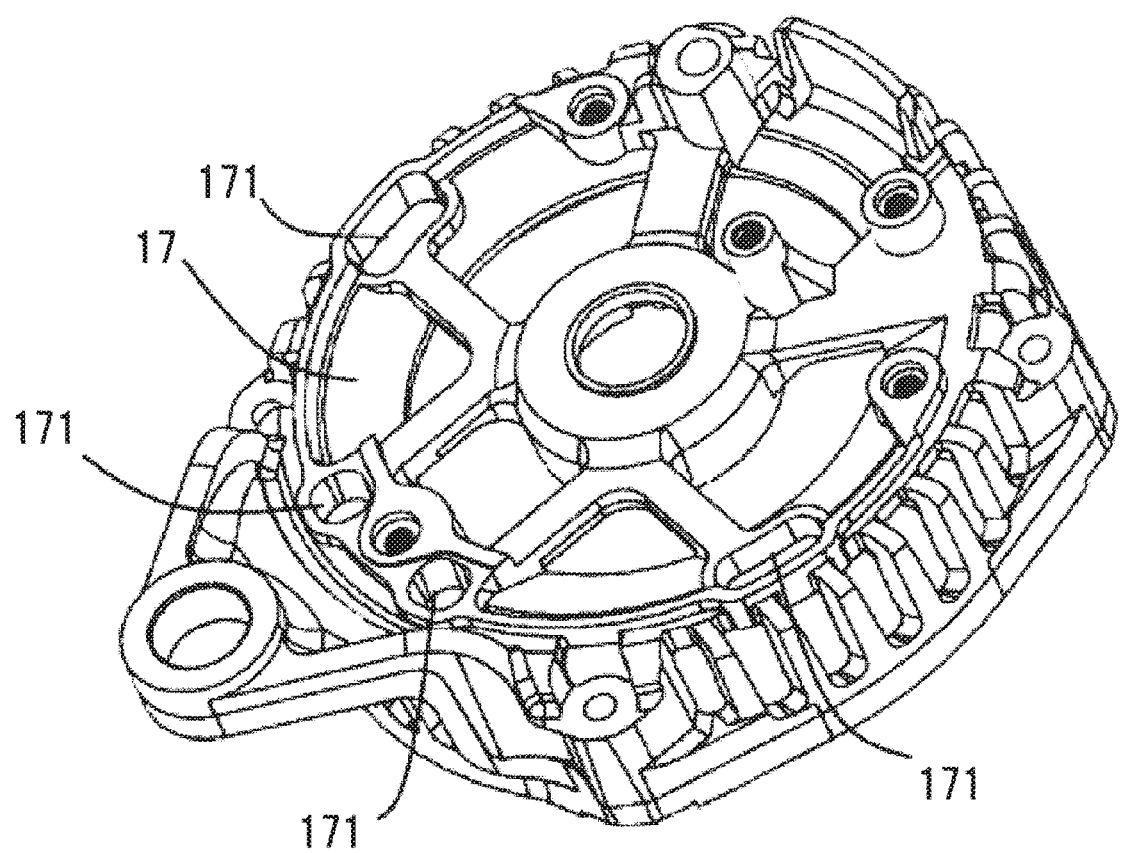
FIG. 6 is a perspective view showing a rear bracket, which is a casing of FIG. 1.

The casing through hole 171 for inserting the first tubular portion 53a and the second tubular portion 53b extended from the main body portion of the terminal block 53 of the rectifying device 5 is opened in the rear bracket 17, as shown in a perspective view of the rear bracket 17 in FIG. 6. Herein, the casing through hole 171 is an aperture portion for inserting the lead 151, and an aperture portion of practically cylindrical form opened to a size into which one tubular portion is inserted, and an aperture portion of an extended elliptical form opened to a size into which a tubular body (530a) of a structure such that two tubular portions are adjacent is inserted, in accordance with the extended position and state of the lead 151, are shown as examples in FIG. 6. That is, there is no need to cause the number of extension places of the lead 151 and the number of casing through holes 171 to coincide.

Also, in the heretofore described example, a description is given of using the tubular body 530a wherein two neighboring tubular portions are integrally configured, but provided that individual tubular bodies are adjacent in one casing through hole 171, the tubular bodies need not necessarily be integrally configured.

Figure 7:
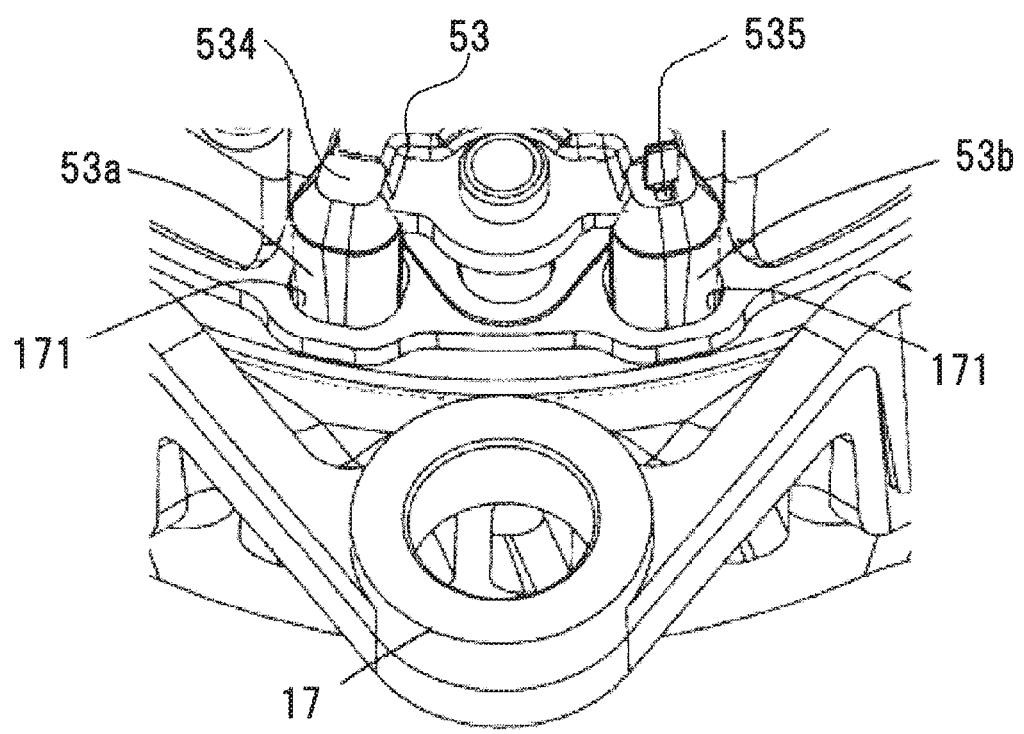
FIG. 7 is a main portion enlarged perspective view showing a fitting portion of the rear bracket and a terminal block.

A main portion enlarged view wherein the first tubular portion 53a and the second tubular portion 53b are inserted into the fixed portion K2 of the terminal block 53 of the rectifying device 5 in the casing through hole 171 of the rear bracket 17 is shown in FIG. 7. As shown in FIG. 7, the second tubular portion 53b in which the lead through hole 535 is provided is inserted into the casing through hole 171 to which the lead 151 is extended, and the first tubular portion 53a in which the sealing portion 534 is provided in place of the lead through hole 535 is inserted into the casing through hole 171 to which no lead 151 is extended, whereby the casing through holes 171 are sealed. The sealing portion 534 of the first tubular portion 53a can practically be configured by not providing the lead through hole 535 in the second tubular portion 53b, and the first tubular portion 53a and the second tubular portion 53b can be commonly designed in places other than this.

Figure 8:
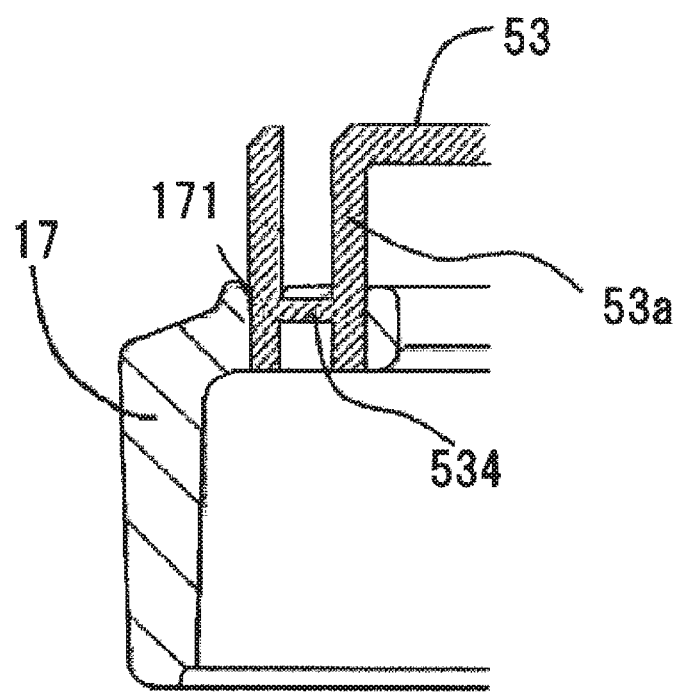
FIG. 8 is a side sectional view showing the fitting portion of the rear bracket and the terminal block.

As shown in a side sectional view of a fitting portion of the rear bracket 17 and the first tubular portion 53a of the terminal block 53 in FIG. 8, the sealing portion 534, not being limited to the kind of example shown in FIG. 7 wherein the sealing portion 534 is disposed on a terminal face of the first tubular portion 53a, is such that an axial direction disposition (height) inside the tube of the first tubular portion 53a can be selected as appropriate.

By the sealing portion 534 being provided in the first tubular portion 53a as heretofore described, cooling air taken into the device is prevented from leaking or flowing back from the casing through hole 171, whereby cooling performance in accordance with design can be secured.

Also, the rear bracket 17 having the same specifications can be used even for a product with specifications such that the number of leads 151 drawn out from the stator winding 15 changes, without changing the form of the casing through hole 171 formed in the rear bracket 17, and the rear bracket 17 can be commonized, that is, standardized. As there is no need to close off the casing through hole 171 of the rear bracket 17 by building up or the like, the rear bracket 17, and a product including the rear bracket 17, can be reduced in weight in comparison with when closing off the casing through hole 171 by building up.

Furthermore, the vehicle-use alternating current generator 1 according to the invention is such that the sealing portion 534 of the terminal block 53 is provided integrally with the first tubular portion 53a, because of which there is no addition of a separate member, and design is easy.

Second Embodiment

Figure 9:
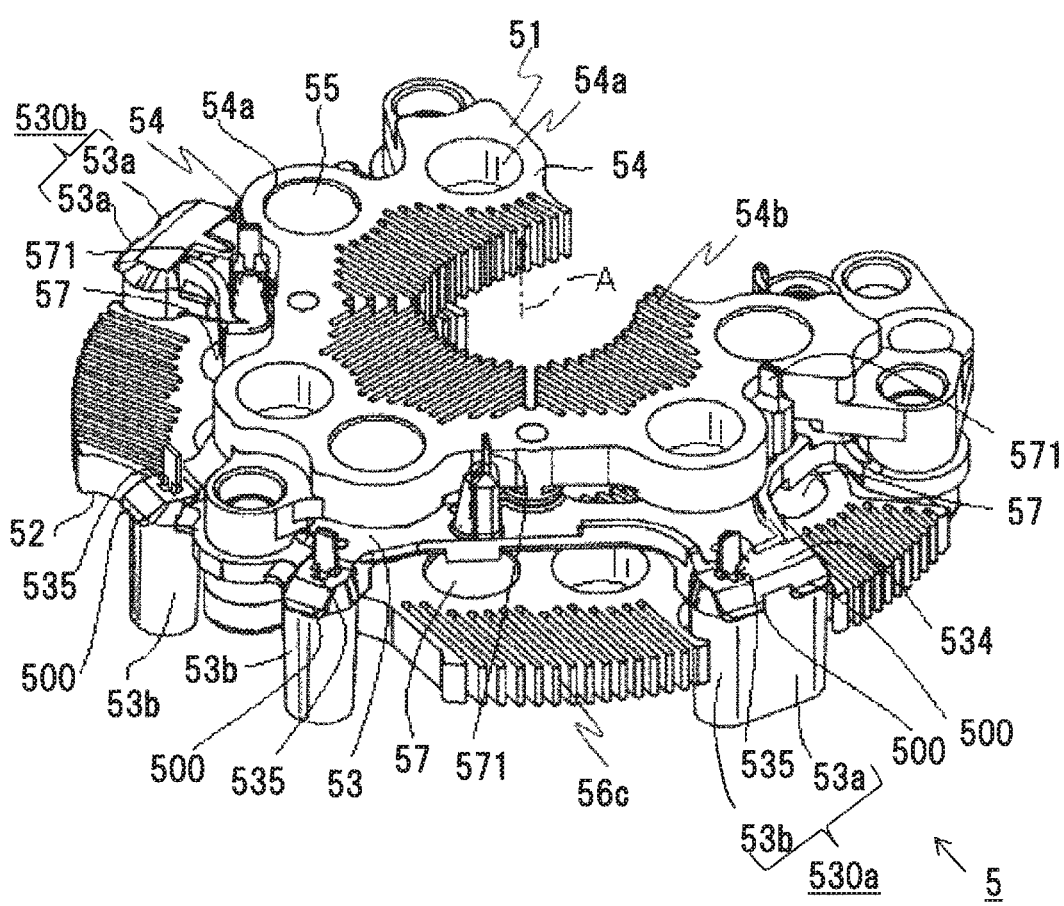
FIG. 9 is a perspective view showing the rectifying device when seen from a cover side of the vehicle-use alternating current generator according to a second embodiment of the invention.

FIG. 9 is a perspective view showing the vehicle-use alternating current generator 1 of a second embodiment of the invention, and is a drawing corresponding to FIG. 2 of the first embodiment. In the first embodiment described above, the example given is such that the first tubular portion 53a and the second tubular portion 53b formed on the terminal block 53 are alternately disposed in the circumferential direction, and the extension places of the lead 151 of the stator winding are comparatively distanced from each other in the circumferential direction (dispersed in the circumferential direction), but in the second embodiment, a description will be given of a structure such that a multiple of the first tubular portion 53a or the second tubular portion 53b are disposed neighboring in the circumferential direction on the terminal block 53, and the leads 151 are extended in comparative proximity to each other.

The second embodiment is such that of a multiple of the first tubular portions 53a and the second tubular portions 53b dispersed in the circumferential direction of the terminal block 53 of the rectifying device 5 and extended in the axial direction, the second tubular portions 53b including the lead through hole 535 are provided concentrated in a circumferential direction central portion, and the first tubular portions 53a including the sealing portion 534 are provided in circumferential direction end portions, as shown in FIG. 9. Herein, for example, it is taken that three leads 151 are disposed in comparative proximity in the circumferential direction, as shown in the perspective view of the stator 8 of FIG. 5C. In the first embodiment, the first tubular portion 53a and the second tubular portion 53b are provided as a pair in the casing through hole 171 of an extended elliptical form, but the second embodiment is such that in the circumferential direction of the C-shaped terminal block 53, firstly, the tubular body 530b wherein two first tubular portions 53a are joined is disposed so as to be inserted into one casing through hole 171 of an extended elliptical form, then one second tubular portion 53b is inserted into each of two neighboring casing through holes 171, after which the tubular body 530*a* wherein the second tubular portion 53*b* and the first tubular portion 53*a* are joined in order is disposed so as to be inserted into one casing through hole 171 of an extended elliptical form. In this way, three second tubular portions 53*b* are disposed in proximity to each other in the circumferential direction, and the second tubular portions 53*b* are inserted individually into a multiple of the neighboring casing through holes 171, on the terminal block 53.

By a multiple of the leads 151 being extended in comparative proximity to each other in this way, the length of leads wound around on the coil end 15*a* can be reduced, whereby cost can be further restricted.

Also, by adopting this configuration, there is practically no change in the specifications of the first tubular portion 53*a* or the second tubular portion 53*b*, and the casing through hole 171 of the rear bracket 17 may also be of the same specifications, in the same way as in the first embodiment, and not only a degree of assembly of the protective cover 6 and the oscillation preventing configuration of the first tubular portion 53*a* and the second tubular portion 53*b* of the terminal block 53 can be standardized, but also the disposition of the lead 151 of the stator winding 15 can be optimized.

This configuration is such that the basic structures of the tubular portions inserted into the casing through hole 171 are the same, and the terminal block 53 can be caused to respond to a change in the way the lead 151 is drawn out, which differs in accordance with model, simply by causing the dispositions of the sealing portion 534 and the lead through hole 535 (the dispositions of the first tubular portion 53*a* and the second tubular portion 53*b*) to differ. Furthermore, the positive side rectifying element 55 and the negative side rectifying element 57 attached to the positive side heatsink 54 and the negative side heatsink 56 may continue to have the same configuration of being distanced from each other (disposed dispersed in the circumferential direction) and thermally advantageous. That is, by a variation in the disposition of the first tubular portion 53*a* and the second tubular portion 53*b* on the terminal block 53 increasing, as in the second embodiment, optimal lead disposition specifications can be implemented, and optimal rectifying element disposition specifications can be balanced.

In the first embodiment and the second embodiment, a description has been given of a case wherein the vehicle-use rotating electrical machine of the invention is the vehicle-use alternating current generator 1, but this is one example. The vehicle-use rotating electrical machine of the invention not being limited to the vehicle-use alternating current generator 1, the same advantages are achieved when the invention is applied to a rotating electrical machine such as a vehicle-use motor or vehicle-use generator-motor.

The embodiments can be freely combined, and each embodiment can be modified or abbreviated as appropriate, without departing from the scope of the invention.

The invention claimed is:

1. A vehicle-use rotating electrical machine, comprising:
a stator disposed inside a casing;
a rotor rotatably supported inside the stator;
a rectifying device disposed on an outer side of the casing on one side in an axial direction and rectifying alternating current generated in the stator; and
a terminal block provided in the rectifying device and electrically connected to a stator winding of the stator, wherein
the terminal block has first and second tubular portions extended from a main body portion of the terminal block and inserted individually into a plurality of casing through holes formed in the casing,
the first tubular portion is inserted into the casing through hole into which a lead of the stator winding is not inserted and a sealing portion that seals the casing through hole is formed, and
the second tubular portion is inserted into the casing through hole into which the lead of the stator winding is inserted, and covers a periphery of the lead of the stator winding, and
a guide portion that guides an insertion of the lead is formed.

2. The vehicle-use rotating electrical machine according to claim 1, wherein one of:
(a) one first tubular portion;
(b) one second tubular portion;
(c) a tubular body wherein a plurality of first tubular portions or a plurality of second tubular portions are integrated, and
(d) a tubular body, wherein the first tubular portion and the second tubular portion are integrated,
is inserted into one casing through hole.

3. The vehicle-use rotating electrical machine according to claim 1, wherein the sealing portion is configured integrally with the first tubular portion.

4. The vehicle-use rotating electrical machine according to claim 1, wherein a lead through hole into which the lead is inserted is provided in the guide portion of the second tubular portion.

5. The vehicle-use rotating electrical machine according to claim 1, wherein the second tubular portion is individually inserted into a neighboring plurality of casing through holes.

6. The vehicle-use rotating electrical machine according to claim 1, wherein the rectifying device includes a first support body that supports a first rectifying element and a second support body that supports a second rectifying element, disposed sandwiching the terminal block,
rectifying element support portions that support the first and second rectifying elements respectively are provided in the first and second support bodies, and a number of the rectifying element support portions equal to or greater than a number of phases of the stator winding are provided in one first support body or second support body.

7. The vehicle-use rotating electrical machine according to claim 6, wherein the first rectifying element supported by the first support body and the second rectifying element supported by the second support body are electrically connected via the terminal block.

8. The vehicle-use rotating electrical machine according to claim 1, comprising a protective cover disposed on an outer side of the casing on one side in the axial direction and protecting an electrical part configuring the rectifying device, wherein
a latching portion in which an outer peripheral wall face of the first tubular portion or the second tubular portion and an inner wall face of the protective cover come into contact is such that a latching projecting portion that latches with the other is provided in at least one of the outer peripheral wall face and inner wall face.

* * * * *